Jan. 30, 1951　　　　F. E. STIRN ET AL　　　2,540,059
METHOD OF AND APPARATUS FOR MEASURING
AND FILLING POWDERS VOLUMETRICALLY
Filed Aug. 2, 1947　　　　　　　　　　　　　4 Sheets-Sheet 4

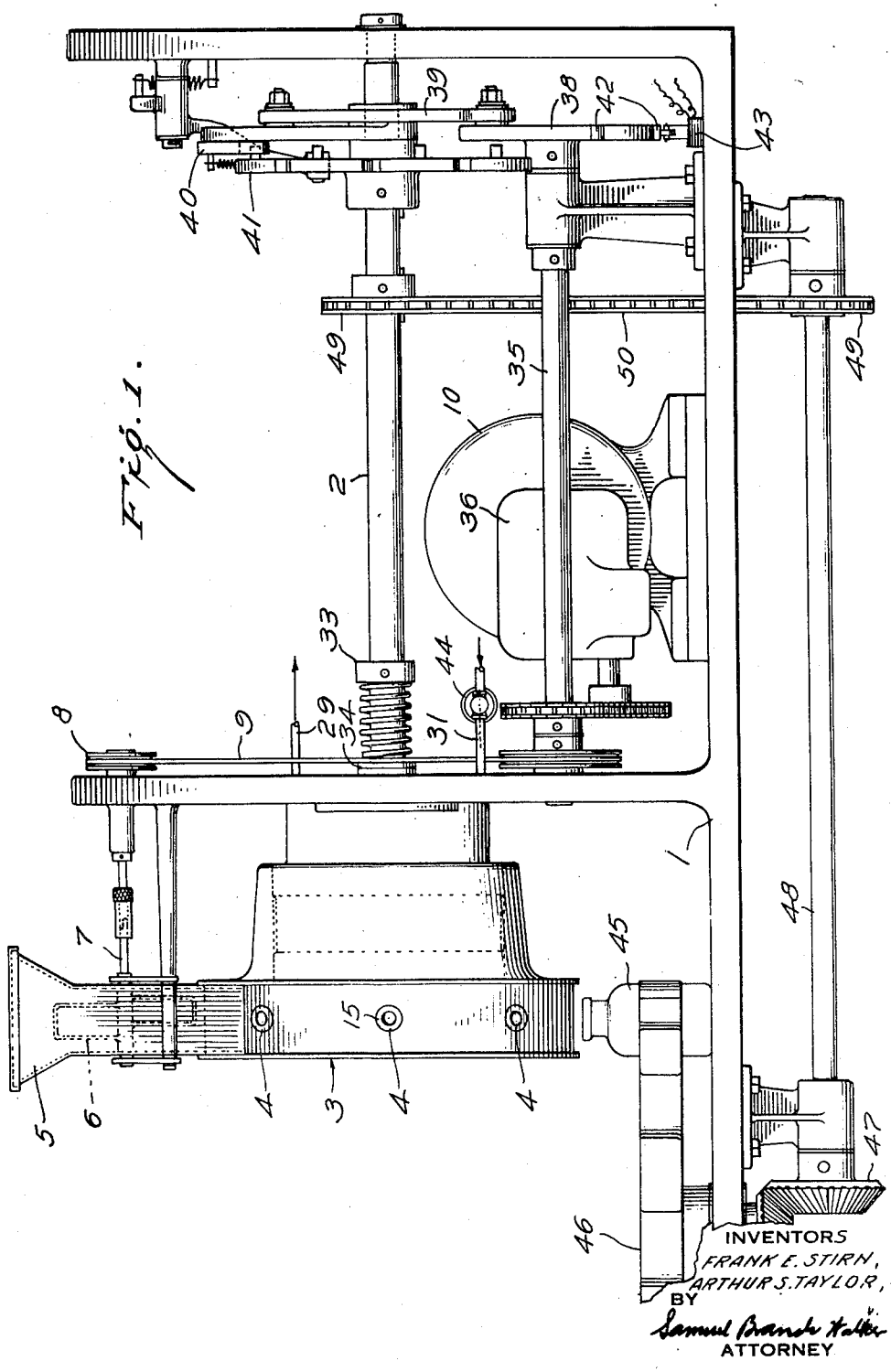

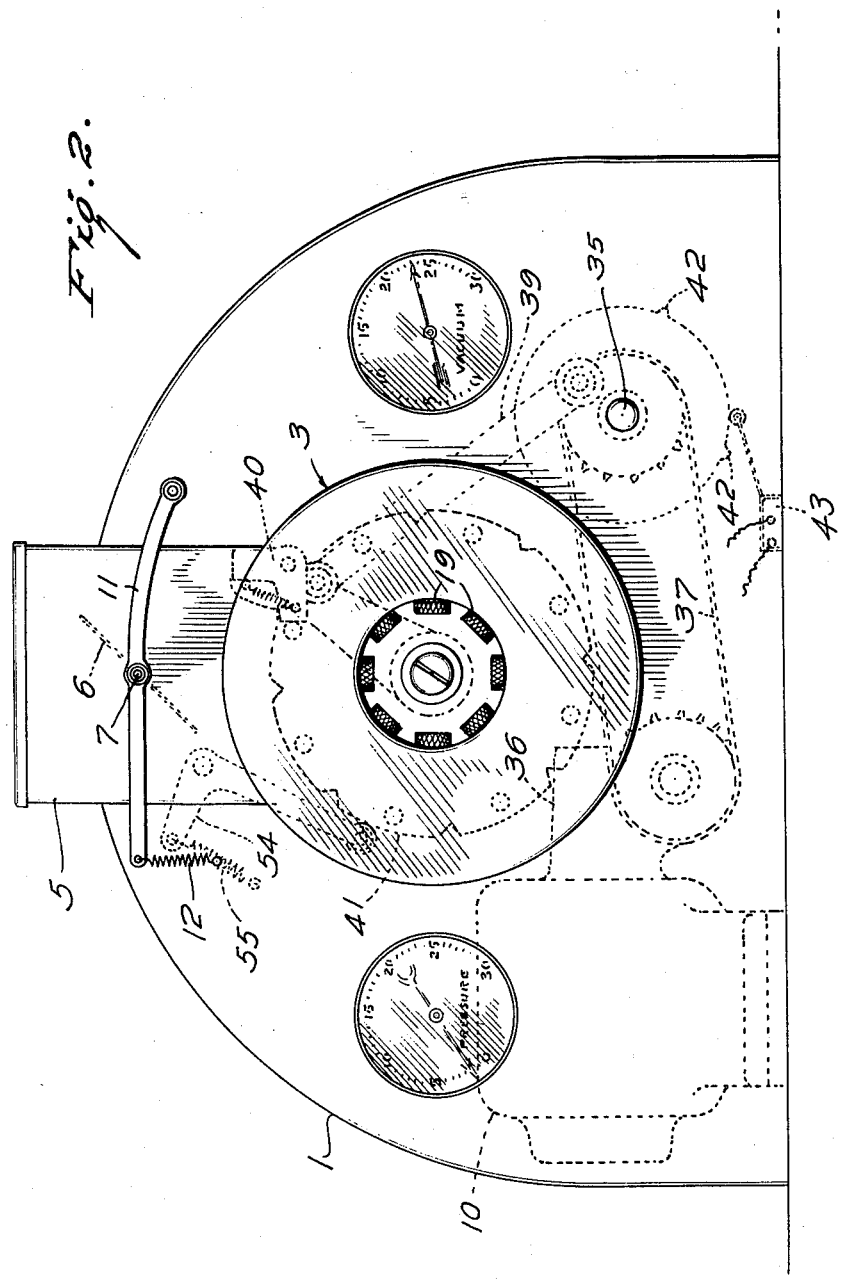

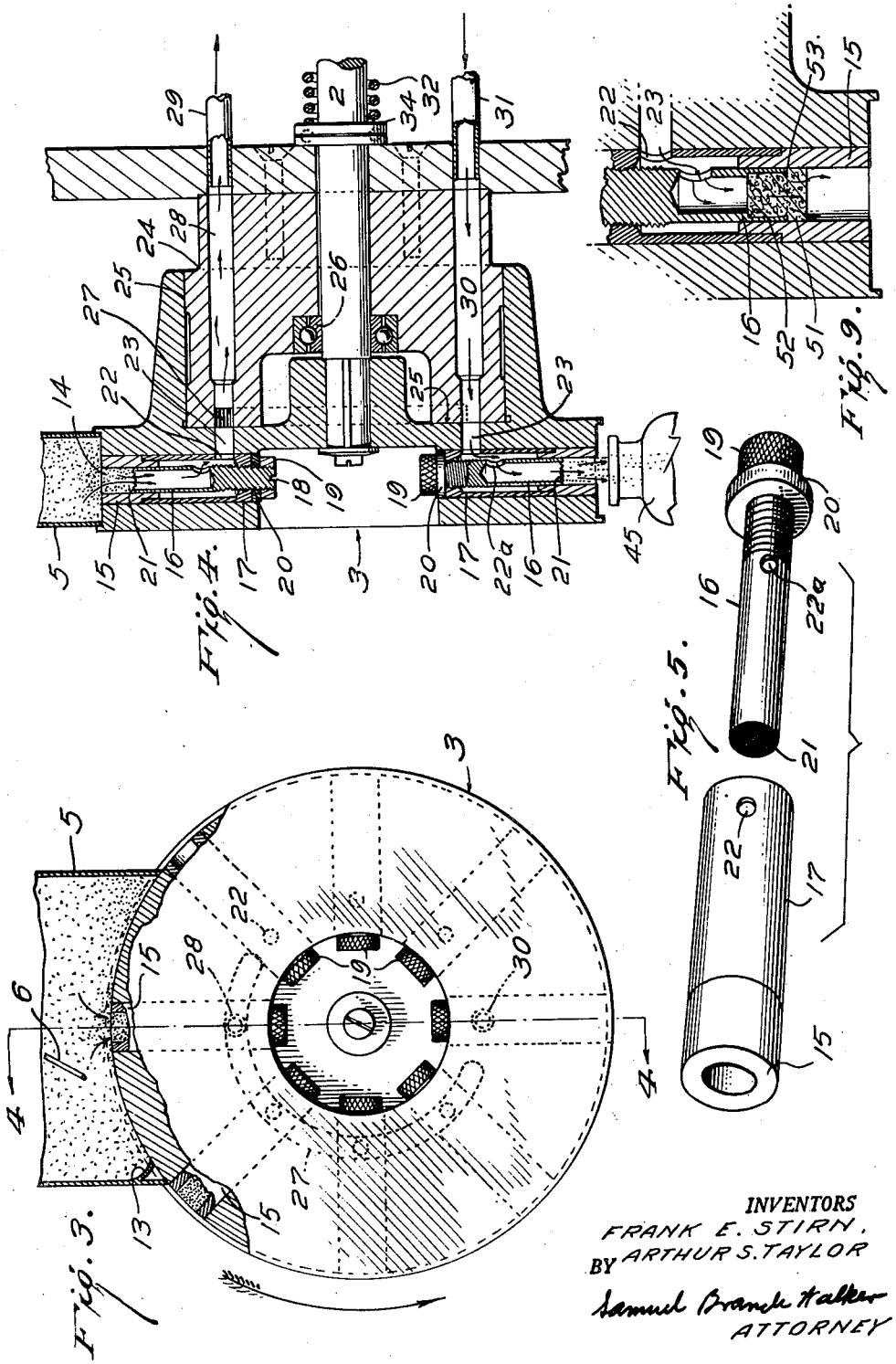

INVENTORS
FRANK E. STIRN,
ARTHUR S. TAYLOR,
BY
Samuel Branch Walker
ATTORNEY

Patented Jan. 30, 1951

2,540,059

UNITED STATES PATENT OFFICE 2,540,059

METHOD OF AND APPARATUS FOR MEASURING AND FILLING POWDERS VOLUMETRICALLY

Frank E. Stirn, Pearl River, and Arthur S. Taylor, Spring Valley, N. Y., assignors to American Cyanamid Company, New York, N. Y., a corporation of Maine Application August 2, 1947, Serial No. 765,680

13 Claims. (Cl. 226—103)

1

The present invention relates to a machine for filling comminuted or powdered or granular products into containers and more particularly to a machine in which the comminuted material is loaded and uniformly packed into a measuring chamber by vacuum, the chamber filled to a predetermined height and the charge thus obtained ejected from the measuring chamber into a container by gas pressure.

In the past considerable difficulty has been found to exist in attempts to get uniform charges of powders into containers of various types. The instant invention overcomes this difficulty by drawing a material to be filled into a charge chamber, or measuring cavity, by vacuum. It has been found that for comparatively homogeneous materials the charge thus drawn into a chamber by a given vacuum is remarkably consistent. The device may thus be used for measuring dosages. The machine of this invention may be used for filling commercial containers with powders such as talcum, face powder, sugar, explosives, resins, etc., usually packed in comparatively large volumes, as well as materials filled in comparatively small volumes, such as pharmaceuticals.

An object of the invention is a method and machine whereby finely divided crystalline products such as penicillin, sulfas and vitamin preparations, etc., may be filled into containers suitable for parenteral use and the individual charges to separate containers maintained within desired limits.

It is a further object of the invention to provide a machine and method of filling powders whereby a uniform quantity of powder may be filled into any type of container.

It is a further object of our invention to provide an automatic machine whereby a powder is agitated as it is filled.

It is yet another object of our invention to provide a method whereby a powder may be more rapidly and conveniently filled than with previous methods.

It is a further object of this invention to provide a device wherein comminuted materials may be drawn into a charge chamber by a vacuum, a portion of the surface of said chamber consisting of a foraminous material, whereby the vacuum will charge and pack the charged material to a consistent density. The charged material is later ejected into a container, whereby the operation is conducted under readily controllable conditions, rapidly, mechanically and without waste and contamination during the fill operation.

In the past it has been customary to fill mate-

2 rials such as crystalline penicillin into a vial by an actual weighing operation, during which the individual charge is weighed as for example, with a "Shadow-matic" balance. While thoroughly satisfactory from the mechanical standpoint, the cost of operating such an individual weighing device has been such as to markedly increase the cost of the production. A single oprator has been able to fill in the neighborhood of 600 to 800 vials per day and additional assistance is required to provide clean bottles, remove the bottles, take care of auxiliary operations, etc. By the instant device it is possible to fill bottles at a far higher rate. By the use of an eight chamber filling head, a constant production rate may be readily obtained of at least 60 charges per minute or approximately 3600 an hour. By using multiple heads or operating faster, it is possible to increase this rate to any desired figure.

Almost any materials of a powdered nature may be filled by the instant machine. Among such products are pharmaceuticals, such as sulfa drugs, powdered vitamins, other dry powders or chemicals such as sugar, salt, gun powder, etc. By the term powder is meant any aggregation of loose material in small solid particles, including not only ground, but crystalline material, flaky material, comminuted material, and other material of a small particulate size. It is not necessary that the material be homogeneous. It is only required that material be reasonably free flowing and that the material have sufficient rigidity so that as it is packed in the charge chamber the vacuum continues to pull at least a small flow of gas through the material so as to hold it in the charge chamber. Some materials will flow freely from the charge chamber upon release of the vacuum, others will require forcible ejection.

Numerous other objects and advantages of the invention will be apparent as it is better understood from the description of a specific embodiment set forth in the following description and accompanying drawings. Many obvious mechanical equivalents and uses will be readily apparent to those skilled in the art upon reading this description.

Referring to the drawing:

Figure 1 shows a side view of the essential portions of the apparatus in working conditions;

Figure 2 is a front view showing pressure and vacuum gauges, filling hopper, and the general position of the fill heads and driving mechanism;

Figure 3 shows a detailed drawing of the filling heads for an eight station machine;

Figure 4 is a sectional view along line 4—4 of Figure 3, showing the details of the adjustable features of the charge containers and the positioning of the foraminous materials and the pressure and vacuum manifolds;

Figure 6:
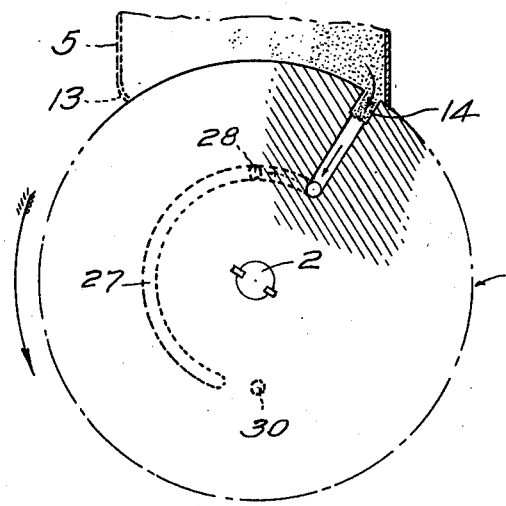
Figure 7:
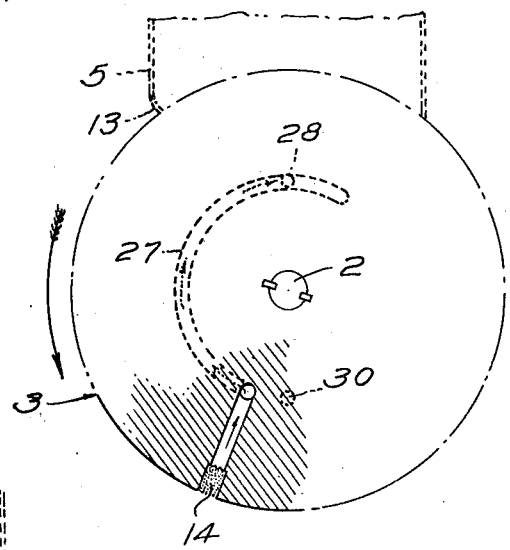
Figure 8:
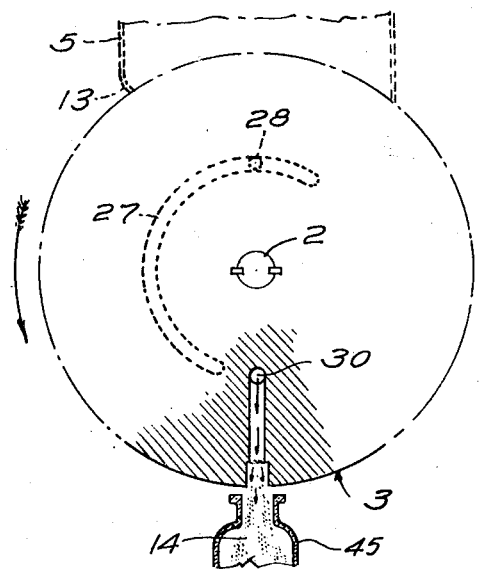

Figure 5 is an exploded view of an individual charge chamber;

Figure 6 is a view showing the filling of a charge containing chamber;

Figure 7 is a view of the vacuum supported charge chamber, swinging around into position over the fill bottle;

Figure 8 is a view showing the ejection into the charge into the container, and

Figure 9 shows an alternate construction of a portion of a charge chamber.

The final machine may have placed upon it a hood to cover the drive mechanism to protect it from dust and to protect the fill material from being contaminated by the mechanism. This hood is not shown in place for purposes of clarity nor is it essential to the effective operation of the mechanism.

The device comprises a support frame 1, which may be integral or built up, to support and retain in position the other portions of the mechanism. Journaled in this frame, directly or indirectly, is a shaft 2 which has mounted on the end thereof a filling head turret 3. As shown in this specific example, the filling head turret has eight filling positions 4. Universally mounted at the top of the filling head is a hopper 5 to contain the fill material. To prevent packing, channeling and uneven distribution of the fill material, in many instances it is desirable to have a stirrer which rotates so vanes on the stirrer cut through in juxtaposition to the filling position while the filling chambers are being filled with the desired charge. This stirrer may consist of a wire loop 6 mounted on a stirrer-shaft 7 having a flexible portion which is in turn driven by a pulley 8 and a belt 9 from the main drive motor 10. In filling fine powders there is a tendency for the powder to escape between the hopper and the filling head turret, so accordingly, the surface of the filling head turret is ground and highly polished, as a cylinder, and lapped with the contacting member of the hopper so that a very fine fit is obtained. As shown in Figure 2 the hopper is mounted on a lever 11 which lever in turn is journaled upon frame member and held in position with a spring 12. By journaling the hopper flexibly about the stirrer-shaft 7 the hopper is free to move a small amount in any direction so that any eccentricities or deviations in the alignment in the filling head are compensated, and the hopper seals powder tight. As shown in Figure 3 a doctor blade 13 may form part of the front edge of the hopper so that the charge 14 in the filling position is dressed down evenly with the surface of the filling head turret.

By so dressing the top surfaces, each individual charge 14 will have an identical volume and because of peculiar and unexpectedly uniform densities of the powdered material, the quantity of each individual charge will be found to be remarkably consistent and uniform. With routine care the charges are easily kept within 2% of the desired value and with larger volumes or greater care even higher degrees of accuracy may be readily obtained when so desired.

In each filling position 4 as shown in Figure 4 there is an inner sleeve 15, which is lapped to match the cylindrical surface of the filling head, and which has a comparatively accurate hole therethrough, in which the adjustable member 16 sits. The inner sleeve 15, and adjustable member 16 form the sides and bottom of the measuring cavity or charge chamber, which contains the charge 14. This adjustable member is screw-mounted in an outer sleeve 17. The outer sleeve 17 and the inner sleeve 15 may be silver soldered, brazed, pinned or screw fastened in position. By careful and delicate machine work these sleeves even may be formed as integral parts of the filling head itself. The adjusting member 16 may be screwed in and out of the sleeve assembly for adjustment of the individual charges 14. It is particularly convenient to have an Allen socket 18 in the end of this member for adjustment. A lock nut 19 and washer 20 bind this member into position so that it will not change from vibration and so that powder or vacuum and gas pressure do not escape from the axial portion of the assembly. At the end of the adjusting member 16 closest to the filling head and forming the bottom of the charge chamber is a foraminous member 21. It is desired that this foraminous member form as large a portion of the charge chamber as possible to avoid pockets being formed in corners where the powder may be packed, and then not ejected. The foraminous material shall be reasonably firm so that it will retain its original position and will not deflect during operations. For some powders a 325 mesh stainless steel screen is eminently satisfactory and may be soldered or brazed into position. The soldered or brazed shoulder should be sufficiently narrow so as not to leave appreciable dead space on which the vacuum and pressure do not act. The central portion of the adjusting member has a hole 22ª formed therein which communicates through passage 22 with an orifice 23. This orifice 23 bears upon the surface of a valve block 24 which valve block acts as a support block for the filling head turret through bearing surfaces 25 and which supports the shaft and filling head assembly through bearing 26. The valve block in embodiment illustrated, has cut therein a vacuum chest 27, which communicates with the orifices 23 so that the vacuum acts through the orifice and the foraminous member 21 on the charge chamber containing the charge 14 from the time at which the chamber is under the hopper 5 until it is nearly in position for discharge. The vacuum chest is connected in turn through a vacuum lead 28 to a source of an adjustable vacuum at 29. At the discharge position there is a pressure tube 30 leading from a source of gas pressure 31 so that as the orifice 23 moves into the discharge position it lines up and communicates with the source of gas pressure.

For purposes of ease of assembly and to avoid the necessity of hairsplitting accuracy in assembly, the shaft is mounted so that all end-play is taken out by a spring 32 which presses against a collar 33, pinned to the shaft 2 at one end, and pressing against the thrust bearing 34 at the other. This spring assembly holds the filling head turret tight against the valve block thus taking care of any wear and preventing the loss of pressure or vacuum.

In the embodiment illustrated a driving motor 10 is provided which through a speed reducer 36 drives the auxiliary shaft 35 which rotates continuously and from which the stirrer is powered. This auxiliary shaft can be directly connected, or more conveniently, as illustrated, through a chain drive 37. At the other end of this auxiliary shaft is an eccentric plate 38 on which is journaled a connecting rod 39, which connecting rod through a rachet 40, and a rachet plate 41, intermittently rotates the filling head by means of a connecting shaft 2. A rachet plate indexing lever 54 and indexing spring 55 hold the rachet plate and driven mechanism in place to prevent accidental turning or misalignment. On the outer edge of the eccentric plate 38 are shown cams 42 which actuate micro-switch 43, which is connected to the gas pressure valve 44. These cams are so located on the surface of the eccentric plate that during the portion of the cycle in which the rachet plate, connecting shaft and filling head are stationary, and a container 45 located under the charge, the micro-switch is actuated, releasing a small charge of gas pressure through the pressure valve 44 which forces out the charge and causes it to drop into the bottle. A second cam is provided so that the charge receives an additional impetus if needed, although usually it is not, and additionally cleans the foraminous member. Under normal operating conditions one cam member is sufficient but the second gives additional reliability for certain types of powders.

A star wheel 46 is provided which in a conventional manner accepts a container from a supply belt (not shown) and rotates it in synchronism under the charge 14. As the filling head rotates this star wheel 46 may be driven by a beveled gear drive 47 and a star wheel drive shaft 48 from star wheel drive sprockets 49, through a drive chain 50.

In operation the motor drives the stirrer continuously which keeps the powder in the hopper light and fluffy. As each charge container successively passes under the hopper, vacuum is applied which sucks each charge container full of the powder. With a consistent vacuum and a reasonably homogeneous powder a remarkably consistent charge is drawn into these charge containers, is uniformly surfaced by the doctor blade and is retained in position by the vacuum. Figure 6 shows the charge being pulled into the charge container as the container passes under the filling hopper. The charge is leveled off under the doctor blade and held into position by the vacuum until it reaches a near bottom position as shown in Figure 7. At this point a container has already been placed under the charge container by means of the star wheel so that even if the powder starts flowing upon releasing of the vacuum it would start flowing into the container. As the filling head is rotated into the discharge position, Figure 8, the pressure tube lines up, the filling head turret stops in this position and a gas blast drives the charge out of the chamber into the container. An additional gas blast cleans out the powder remaining and foraminous member, preparatory to receiving the next charge.

Each of the discharge containers is individually adjustable by means of the adjusting member 16, together with its lock nut and washers, so that by weighing the charge from each chamber, that chamber may be adjusted to uniformity, and all charges to the desired weight. The foraminous material illustrated in the above embodiment is 325 mesh stainless steel screen. Other materials may be used, sintered glass, sintered metals, felts, porcelains, and grained wood, such as balsa wood, or other materials which are sufficiently fine to prevent the drawing of powder into the machine, and yet sufficiently porous to allow the vacuum to compact and retain the charge. For fine materials a 325 mesh stainless steel screen is apt to allow finer portions to penetrate to get into the vacuum system. As shown in Figure 9 this may be prevented by using a finer mesh or in the case of an extremely finely powdered crystalline material as talc, or microcrystalline pharmaceuticals, a felt 51 may be retained between portions of the adjusting member which in such modification may be built up. More easily a felt may be placed on a shoulder 52 in the end of the adjusting member which may be provided with a shoulder to act as a retainer therefor, and the upper end of the adjusting member peened or turned into an edge 53 to retain the felt. When so treated the felt may occupy the entire diameter of the inner sleeve 15 and yet be sufficiently firm and solid so that no appreciable packing takes place under vacuum or gas pressure, thus insuring that the charge chamber does vary in size. By a suitable choice of a felt, it will be sufficiently porous so that pressure or vacuum will readily act through the felt and yet the felt will have a sufficiently fine structure to act as a filter to prevent any of the powdered materials escaping into the vacuum chest. Using a piece of felt such as is normally found as the oil felt in an electric motor, powders as fine as pulverized crystalline penicillin may be filled on the machine for a long period without any appreciable portion escaping past the felts into the vacuum chest and manifold ducts. The coarser powders work well with a grill or screen which is likewise coarser, and more porous.

For many purposes it is desirable to have an individual mechanical pump so that the vacuum on the machine is not influenced by extraneous operations. It is frequently desirable to have a reducing valve on the vacuum system so that the vacuum may be adjusted, with certain types of materials. A vacuum of more than about 20" of mercury gives a charge which does not vary appreciably over this pressure range for fine powders. However, for most materials, if the vacuum is dropped the charge decreases slightly. By so adjusting the vacuum as to a few inches of mercury, it is possible to change slightly the charge so that without adjusting the individual charge chamber, the charge may be varied over a small range to compensate for a lack of homogeneity in the filled material. The higher vacuum is usually more desirable as a slight change in the vacuum will have a less effect on the individual charge.

In addition to the foraminous members as disclosed above, a material such as sintered glass may be used. This may be conveniently done by cutting a shoulder against which the sintered glass is held by the adjusting member 16, with a suitable use of washers. If desired the washers may be built non-adjustable so that the charge members are of identical size and cannot be changed.

Further, if desired the adjusting members may be geared to each other so that all members may be adjusted simultaneously. For some applications, the chambers may be built non-adjustable, as for filling certain powders, a variation in size of charge may not be necessary, nor desirable. Such modifications are obivous within the present invention. The charge chamber may vary in size and shape. If the same machine is to be used over a considerable range of charges, certain of the charge chambers may be made small in diameter, and long and the diameters increased to give addition variation in charges. For particularly free flowing powders it may be desirable to have the diameters comparatively small to prevent loss of materials. Further, with some types of powders, particularly with the large particle free flowing type, it may be desired that the sleeve 15 itself, be constructed of a foraminous material, so that suction is applied over practically the entire contacting surface of the charge chamber. With free flowing materials it may be necessary that the vacuum shaft be adjusted so that vacuum is maintained on the charge up until the time that it is released and discharged. This may be accomplished by using auxiliary vacuum chest in which the vacuum is maintained in an auxiliary chest up until gas pressure is placed on such chest for discharge. Or the entire valve block assembly may be made movable and driven by an eccentric so that the vacuum is held by the chest until the charge reaches the discharge point by shifting the valve block. For some applications, a mechanical ejection can be used. The bottom of the charge chamber may be movable, by a cam or other mechanism, so that the powder is ejected by moving the adjusting member 16. Except with free flowing, large size powders, such type of operation may tend to clog the porous members, but auxiliary air could then be used to clean this member during a suitable portion of its cycle. Mechanical ejection tends to give a solid discharge, which is particularly useful where the powder must be packed into the final container, or where the powder is so loose or fragile that gas pressure ejection would cause loss. Such modifications will suggest themselves to those skilled in the art, as the need arises, in conjunction with the type of particular materials.

The gas pressure may be air, nitrogen, carbon dioxide or other gas as indicated by specific applications. In fact, the whole filling head assembly may be placed under a shield, filled with an inert gas, or sterile atmosphere, if so desired.

The gas pressure to be used will vary with conditions but should normally be adjusted to the lowest pressure that will uniformly and consistently eject the charge. Greater pressure may cause slight losses in the charge by blowing of part of the charge. If adjusted with a proper pressure air jet, the discharge operation is practically dustless. Frequently the charge is ejected practically integrally and may be seen in the bottom of the receiving container in its original underformed state. The valve system 44 may be any conventional electric operated pressure valve, as for example a solenoid operated switch. Mechanical connections can be used, but may be more cumbersome. Under some conditions it will be found desirable to use two different gas pressure mechanisms, the ejector blast being at a low pressure, and the second cleaning blast at a higher pressure.

The final container is illustrated as a glass bottle, but metal containers or other types of vials may be used where desired. Various types of safety mechanisms may be used, such as switches under the star wheel so that a bottle must be in filling position before the charge will be ejected. Safety devices may be incorporated so that if a bottle becomes jammed or falls, the machine will stop. A switch may be built into the vacuum line so that if the vacuum drops, as for example, when the hopper becomes nearly empty and free air may enter the chambers, the machine will automatically disengage itself.

Other mechanical safety devices will suggest themselves to those skilled in the art. If small mouth containers are used, a funnel may be used to insure all of the charge entering the container. A funnel wheel may be placed above the star wheel. The number of charge chambers used on an individual filling head may be varied at will. They may be arranged as shown, or additional rows may be arranged axially as well as circumferentially in the filling head. A cover may be used over the filling hopper to prevent dust from falling therein. The filling hopper may be made of a plastic material so that the amount of charge within the hopper may be seen at all times. For high speed operation, where a funnel wheel or reasonably wide neck containers are used, the filling head turret and star wheel may turn continually, and the filling of the charge and its ejection occur at the proper locations without the stop motion period. Such operation tends to be less accurate, and gives greater dust losses, but for many if not most filling requirements, such operation is commercially satisfactory and faster. Other modifications will suggest themselves to those skilled in the art.

It is thought that the invention and many of its advantages will be understood from the foregoing description, as will obvious changes which may be made in the form, contacts and parts, without departing from the spirit of the invention or sacrifice its many advantages. The form described is merely an embodiment. The full scope of the invention is more accurately described by the following claims:

We claim as our invention:

1. In a machine for uniformly filling containers with powdered material, a filling head, a hopper resting upon the filling head, feeding a measuring cavity in said filling head, said cavity having at least a portion of its surface of a foraminous material, a doctor means to strike off evenly a filled material in said cavity, passages connected with the reverse side of said foraminous material connectable to vacuum in at least a portion of the loading position and connectable to a gas pressure in the discharge position.

2. A machine for uniformly filling containers with powdered material comprising a hopper resting upon a filling head turret and feeding at least one measuring cavity in said turret, said cavity having at least a portion of its surface of a foraminous material, a doctor blade device to strike off evenly filled materials in said cavity, a passage connected with the reverse of said foraminous material which is connectable to a vacuum source when said cavity is in loading position and means for ejecting the powdered material into a container when said cavity is in a discharge position.

3. In a machine for uniformly filling containers of powdered materials a rotatable filling head turret, a hopper resting thereupon, feeding at least one measuring cavity in said filling head turret, a foraminous material forming at least a portion of the surface of said cavity, a doctor means positioned to strike off evenly the filled material in said cavity during rotation, suction means, gas pressure means, and manifold passages arranged so that said suction means are connected by said manifold passages to the back portion of said foraminous material during at least a part of the charge portion of the filling cycle and said gas pressure means is connected during the discharge portion.

4. In a machine of the class described, a container conveyor means to position containers in a discharge position during at least the discharge portion of a filling cycle, a filling head turret, a powder hopper resting upon said filling head turret, a stirrer in said hopper, and at least one measuring cavity in said filling head turret, a foraminous material forming at least a portion of the surface of said cavity with the non-cavity side of said foraminous material being connectable to sources of vacuum and pressure so arranged that the contents of said hopper are uniformly packed by suction into said measuring cavity during the filling portion, and forcibly ejected by gas pressure into said container during the discharge portion of a filling cycle.

5. The method of filling containers with uniform quantities of powder which consists in successively passing under a hopper cavities of uniform size, having a portion of their surface of a foraminous material, withdrawing the gas present in said cavities through said foraminous material, whereby the filled powder is uniformly packed into said cavities, successively moving said cavities past a doctor means, and ejecting successively said charges of powder from successive cavities into successive containers.

6. The method of filling containers with uniform quantities of powder which consists in successively passing under a hopper cavities of uniform size, having a portion of their surface of a foraminous material, withdrawing the gas present in said cavities through said foraminous material, whereby the filled powder is uniformly packed into said cavities, successively moving said cavities past a doctor means, and ejecting said powder by means of gas pressure, into successive containers.

7. The method of filling containers with uniform quantities of powder which consists in successively passing under a hopper cavities of uniform size, having a portion of their surface of a foraminous material, withdrawing the gas present in said cavities through said foraminous material, whereby the filled powder is uniformly packed into said cavities, successively moving said cavities past a doctor means, and ejecting successively said charges of powder from successive cavities into successive containers, the powder in said hopper being mechanically agitated to insure homogeniety.

8. In a machine for filling a powdered product into containers in uniform quantities, a container conveyor, means to position containers in a filling position, a rotatable filling head turret, at least one charge chamber in said turret, a foraminous material comprising at least a portion of the surface of said charge chamber, a manifold means, suction means, and gas pressure means, whereby the suction means is connected to the back portion of said foraminous material during at least a part of the filling portion of the cycle, and the gas pressure means is connected to the back portion of said foraminous means during at least a portion of the discharge portion of the cycle, a hopper resting upon said filling head turret, an agitator in said hopper comprising a member which approaches the surface of the filling head turret, and a doctor means so positioned that the contents of the charge chamber are struck off even with the surface of the filling head turret as it revolves.

9. The method of filling containers with uniform quantities of powder material which comprises passing under a hopper cavities of uniform size having a wall area of foraminous material, applying suction to said cavities through said foraminous material while under the feeding portion of said hopper thereby to pack the powder uniformly into said cavities, successively moving said cavities past a doctor means and out of communication with said hopper while maintaining the suction on the respective cavities, and ejecting successively said charges of powder from successive cavities into successive containers.

10. The method of filling containers with uniform quantities of powder material which comprises passing cavities of uniform size provided with a wall area of foraminous material under a supply hopper, applying suction to said cavities through said foraminous material while the respective cavities are in communication with said hopper to charge the cavities, successively advancing said cavities past a doctor means and out of communication with said hopper to a discharge position and maintaining the suction thereon until the respective cavities substantially reach said discharge position, and successively ejecting the charges from the respective cavities into successive containers at said discharge position.

11. In a machine of the class described a rotary turret having at least one measuring cavity adapted to be moved to powder filling and powder discharge positions respectively, a foraminous material forming at least a portion of the wall of said cavity, a powder supply hopper associated with said turret at said filling position, means for striking off the powder level of the cavity as it is moved from communication with said powder hopper, a source of suction and manifold connections arranged to apply the suction to said cavity through said foraminous material while the cavity is in filling position under said hopper and the powder level thereof is struck off, and a source of gas pressure and manifold connections arranged to apply the gas pressure to said cavity through said foraminous material at said discharge position.

12. In a machine for charging containers with a uniform quantity of powder material, a rotary turret provided with measuring cavities adapted to be moved successively to filling and discharge positions, means for presenting successively containers at the discharge position in timed relation with the rotation of said turret, a powder supply hopper associated with said turret at said filling position, a foraminous material forming at least a portion of the wall of each of said cavities, a source of suction and manifold connections for applying the suction to the respective cavities through the foraminous wall area while in communication with said hopper, means for striking off the powder level of the respective cavities as they are moved from communication with said hopper, said suction manifold means being arranged to maintain suction on the respective cavities until they reach substantially said discharge position, and a source of gas pressure and manifold connections arranged to apply the gas pressure to the respective cavities through the foraminous area at said discharge position to eject the charges into the respective containers.

13. In a machine of the class described, a container conveying means to position containers in a receiving relationship during at least the charge transfer portion of a filling cycle, a filling head turret, a powder hopper in a cooperative relationship with said filling head turret, at least one measuring cavity in said filling head turret, doctor means positioned to strike off the contents thereof, a foraminous material forming at least a portion of the surface of said cavity, connection means to the non-cavity side of said foraminous material, and manifold and valve means whereby the contents of said hopper are uniformly packed by suction into said measuring cavity during at least the entire filling portion and forcibly ejected by gas pressure acting on the powder during the discharge portion of the filling cycle.

FRANK E. STIRN.
ARTHUR S. TAYLOR.

REFERENCES CITED

The following references are of record in the file of this patent:

UNITED STATES PATENTS

| Number | Name | Date |
|---|---|---|
| 1,052,653 | Crowley | Feb. 11, 1913 |
| 2,282,477 | Joa | May 12, 1942 |
| 2,488,395 | Goldberg | Nov. 15, 1949 |